(12) United States Patent
Motoshima et al.

(10) Patent No.: US 8,602,932 B2
(45) Date of Patent: Dec. 10, 2013

(54) CHAIN

(75) Inventors: Yoshiki Motoshima, Osaka (JP); Masatoshi Sonoda, Osaka (JP); Takayuki Morimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 249 days.

(21) Appl. No.: 13/218,079

(22) Filed: Aug. 25, 2011

(65) Prior Publication Data

US 2012/0065013 A1 Mar. 15, 2012

(30) Foreign Application Priority Data

Sep. 14, 2010 (JP) ................................. 2010-205716

(51) Int. Cl.
*F16G 13/04* (2006.01)

(52) U.S. Cl.
USPC ......................................... 474/213; 474/212

(58) Field of Classification Search
USPC ................................. 474/212–214
See application file for complete search history.

(56) References Cited

U.S. PATENT DOCUMENTS

| 958,466 | A | * | 5/1910 | Belcher | 474/213 |
|---|---|---|---|---|---|
| 1,270,460 | A | * | 6/1918 | Taylor | 474/157 |
| 1,678,457 | A | * | 7/1928 | Belcher | 474/157 |
| 1,945,357 | A | * | 1/1934 | Pierce | 474/210 |
| 2,069,591 | A | * | 2/1937 | Pierce | 474/217 |
| 2,667,791 | A | * | 2/1954 | Bremer | 474/214 |
| 3,153,348 | A | * | 10/1964 | Kuntzmann | 474/231 |
| 4,227,425 | A | * | 10/1980 | Bendall | 474/213 |
| 4,463,550 | A | * | 8/1984 | Avramidis | 59/84 |
| 5,464,374 | A | * | 11/1995 | Mott | 474/224 |
| 5,989,141 | A | * | 11/1999 | Kozakura et al. | 474/230 |
| 6,406,394 | B1 | * | 6/2002 | Bubel et al. | 474/212 |
| 6,485,385 | B2 | * | 11/2002 | Shimaya | 474/213 |
| 6,733,410 | B2 | * | 5/2004 | Saito | 474/212 |
| 6,969,332 | B2 | * | 11/2005 | Sakamoto et al. | 474/212 |
| 7,056,248 | B2 | * | 6/2006 | Butterfield | 474/212 |
| 7,404,778 | B2 | * | 7/2008 | Butterfield | 474/212 |
| 7,497,795 | B2 | * | 3/2009 | Tohara et al. | 474/212 |
| 7,882,689 | B2 | * | 2/2011 | Tada et al. | 59/35.1 |
| 2001/0003718 | A1 | * | 6/2001 | Ichikawa et al. | 474/229 |
| 2002/0061800 | A1 | * | 5/2002 | Saito | 474/212 |
| 2002/0111238 | A1 | * | 8/2002 | Okabe et al. | 474/213 |
| 2002/0123404 | A1 | * | 9/2002 | Okabe | 474/212 |

(Continued)

FOREIGN PATENT DOCUMENTS

| JP | 2009-174606 | 8/2009 |
|---|---|---|
| JP | 2009-174607 | 8/2009 |

*Primary Examiner* — William A Rivera
*Assistant Examiner* — Henry Liu
(74) *Attorney, Agent, or Firm* — Howson & Howson LLP (57) ABSTRACT

There is provided a chain comprising guide link rows and non-guide link rows disposed alternately along the length of the chain with each plate of each row overlapping each plate of each of two adjacent rows. For each guide link row, a pair of pins is provided for connecting the guide link rows and non-guide link rows in articulating relationship. The first connecting pin extends into a first hole of each of the guide plates of its guide link row and into and through the second hole of each link plate of an adjacent non-guide link row. The second connecting pin extends into a second hole of each of the guide plates extends into and through a first hole of each link plate of an adjacent non-guide link row. The connecting pins fit tightly into each first hole into which it extends and fits loosely in each second hole into which it extends.

5 Claims, 6 Drawing Sheets

(56) References Cited

U.S. PATENT DOCUMENTS

| | | | |
|---|---|---|---|
| 2002/0128102 A1* | 9/2002 | Bubel et al. | 474/212 |
| 2002/0169046 A1* | 11/2002 | Sakamoto et al. | 474/212 |
| 2005/0049097 A1* | 3/2005 | Butterfield | 474/206 |
| 2005/0049098 A1* | 3/2005 | Butterfield | 474/212 |
| 2006/0105872 A1* | 5/2006 | Tohara et al. | 474/212 |
| 2009/0048047 A1* | 2/2009 | Nagae et al. | 474/212 |
| 2009/0186729 A1* | 7/2009 | Tohara | 474/213 |
| 2009/0186731 A1* | 7/2009 | Tohara | 474/213 |
| 2009/0186732 A1* | 7/2009 | Tohara et al. | 474/213 |

* cited by examiner

PRIOR ART

FIG.6

PRIOR ART

CHAIN

CROSS REFERENCE TO RELATED APPLICATIONS

This application claims priority on the basis of Japanese Patent Application 2010-205716, filed on Sep. 14, 2010. The disclosure of Japanese Patent Application 2010-205716 is incorporated by reference.

FIELD OF THE INVENTION

This invention relates to a silent transmission chain composed of link plates connected articulably in interleaved rows by link pins, and having guide plates disposed on its outer sides for maintaining alignment of the chain with sprockets with which it is in driving and driven relationship.

BACKGROUND OF THE INVENTION

A typical silent chain for use in power transmission is composed of guide link rows, each comprising a pair of guide plates and a plurality of intermediate link plates disposed between the guide plates, and non-guide link rows, each comprising a plurality of inner link plates. The guide link rows and non-guide link rows are disposed alternately along the length of the chain, and the plates of the guide link rows are interleaved with the plates of the non-guide link rows and connected by connecting pins so that interconnected link rows can articulate relative to each other. Each plate has a pair of holes, one of which can be a front hole and the other of which can be a rear hole, the terms "front" and "rear" referring to the direction in which the chain ordinarily moves when in operation. A pair of connecting pins extends through each of these holes.

The shapes, dimensions, deformations, deflections, etc. of the chains of the prior art or of the invention are not represented to scale in the drawings. Instead, elements are simplified or exaggerated for the purposes of explanation. The terms "front" and "rear" are used in the description for convenient reference, referring to the usual direction of travel of the chain. However, the features described by the terms "front" and "rear" may be reversed. Therefore, the terms "first" and "second" are also used. A "first" link pin hole may, therefore, be a "front" or "rear" hole.

Figure 5:
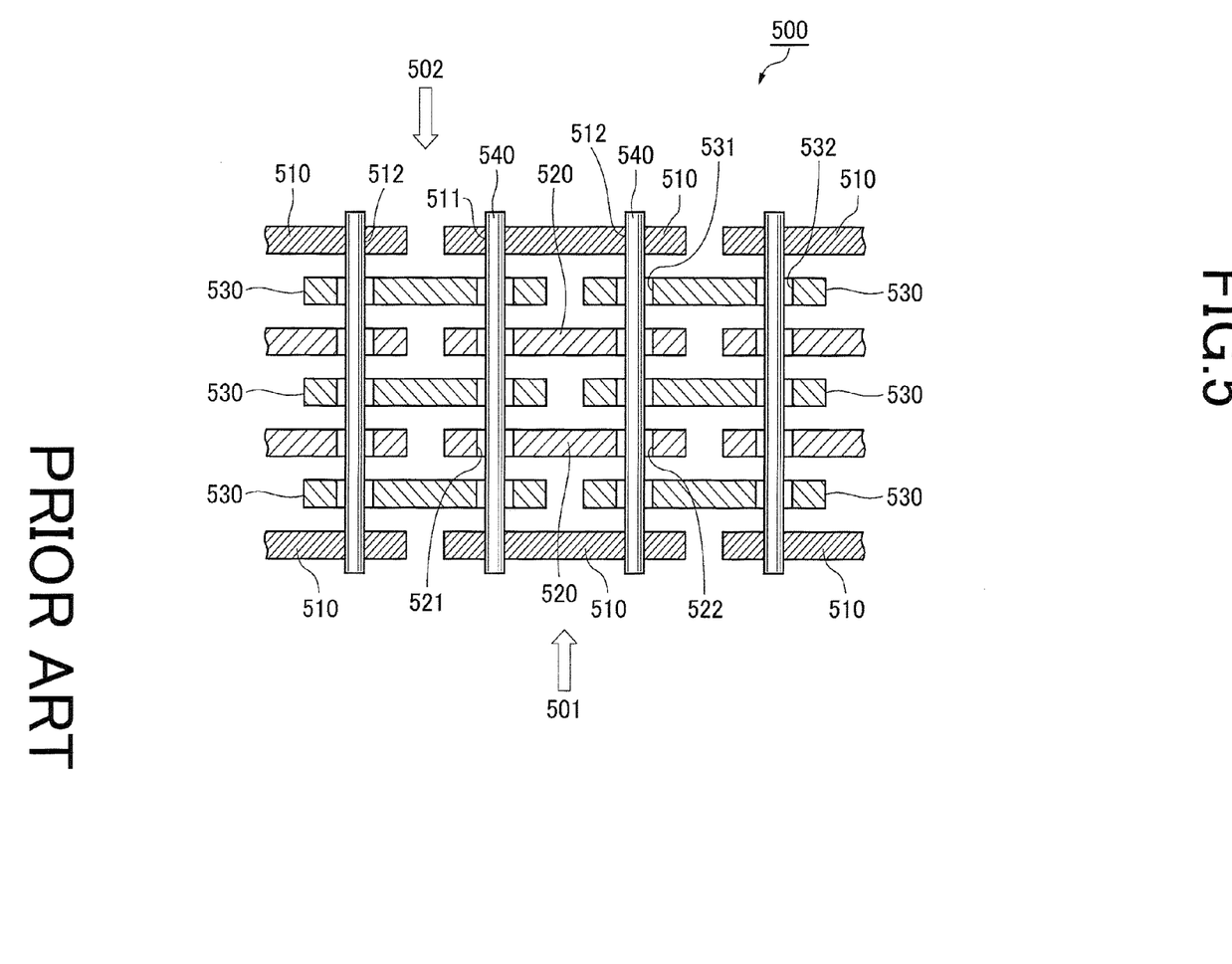
FIG. 5 is an explanatory plan view of a prior art chain.

In the conventional chain 500 shown in FIG. 5, pairs of link plates 510 are arranged in guide link rows 501. Intermediate link plates 520 are arranged between the link plates 510 of each guide link row 501. Inner link plates 530 are arranged in non-guide link rows 502. Each plate has a pair of link pin holes.

The guide link rows and non-guide link rows are disposed alternately along the length of the chain with each plate of each row overlapping each plate of each of two adjacent rows. A pair of connecting pins for each guide link row connects the guide link rows and non-guide link rows in articulating relationship.

The first connecting pin 540 extends through the first pin holes 511 and 521 of the guide link plates 510 and the intermediate link plates 520 of each guide link row 501, and through the second pin holes 532 of the inner link plates 530 of each non-guide link row 501. The second connecting pin 540 extends and through the second pin holes 512 and 522 of the link plates 510 and the intermediate link plates 520 of each guide link row 501 and the first pin holes 531 of the inner link plates 530 of each non-guide link row 501.

The link pins 540 fit tightly into the front and rear pin holes 511 and 512, of each guide link plate 510. The link pins fit loosely into the pair of front and rear pin holes, 521, 531, 522 and 532, of each intermediate link plate 520 and each inner link plate 530. The gap between the pin and the sides of the pin holes are known.

Figure 6:
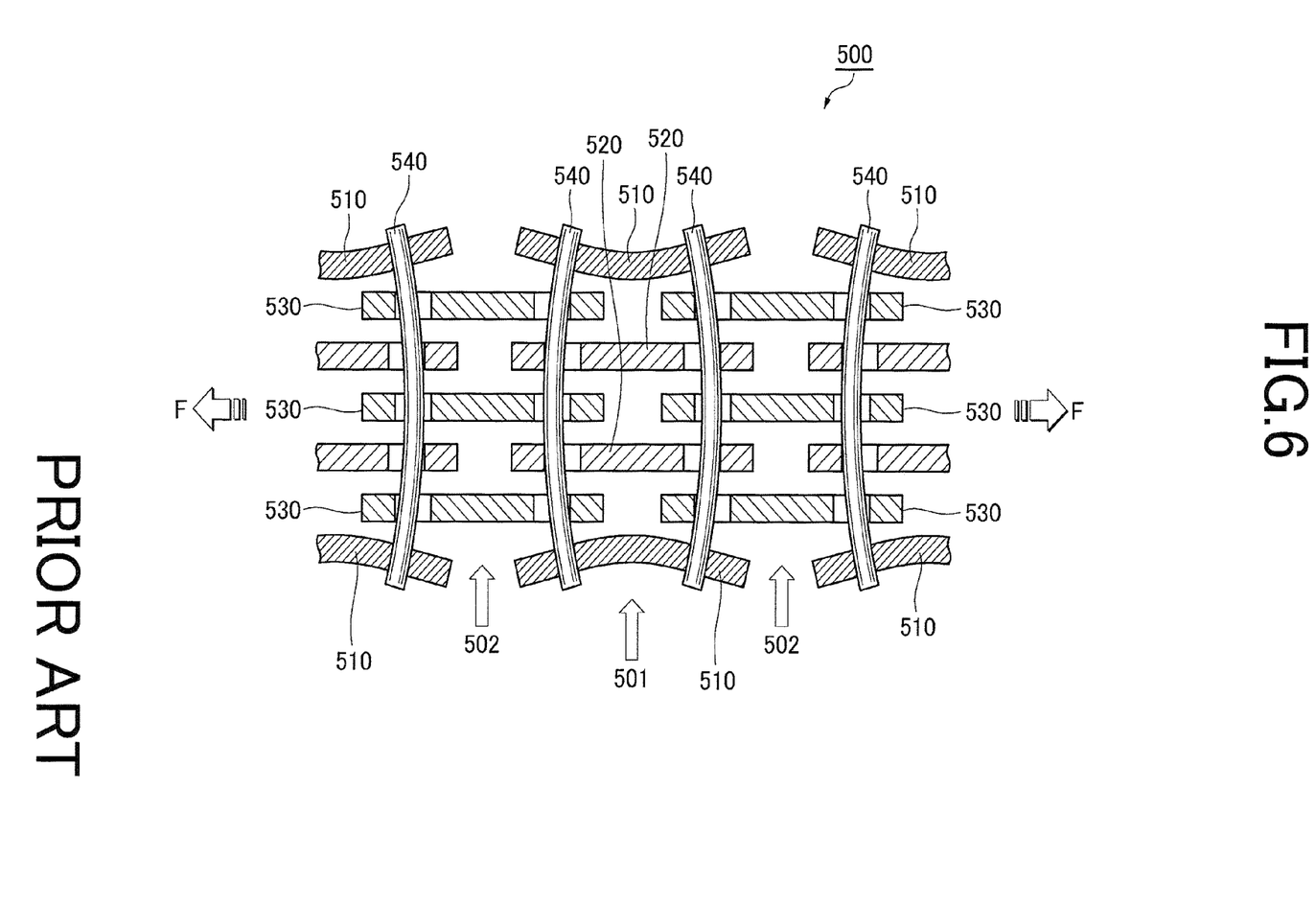
FIG. 6 is an explanatory plan view of the prior art chain in a state in which a tension is applied to the chain.

As shown in FIG. 6, because the link pins 540 are fit tightly into the pin holes (511, 512 FIG. 5) in the guide plates 510, but loosely in the pin holes (521, 522, 531, 532 FIG. 5) of the inner link 530 and intermediate link plates 520, the link pins 540 tend to bend when tension is applied to the chain in the direction of motion F. As a result of the bending of the connecting pins, tension is applied to the intermediate link plates and inner link plates unevenly, reducing the overall tensile strength of the chain, increasing elongation of the chain due to excessive wear, and increasing noise due to repetitive deformation.

Japanese Laid-Open Patent Applications 2009-174606 and 2009-174607 address this problem by varying the diameters and pitches of the pin holes in the plates of each non-guide row with increasing distance from the guide plates. This construction allows tensile force to distribute more uniformly despite deflection of the connecting pins. Thus, wear, elongation and the likelihood of rupture are reduced.

While these chains alleviate the tension imbalance to a degree, the bend of the link pins and the warp of the guide link plates are not eliminated, and the problems of wear, elongation, heat and noise discussed above, are still present.

In addition, because the diameter and pitch of the holes of each of the inner link plates vary, each must be manufactured separately and positioned in the chain accurately. Thus, production and assembly costs are increased.

Further, because the size and pitch of the pin holes are defined based on a predetermined bend in the connecting pin, any variation in the bend of the pin, due to variation of the chain tension, results in an imbalance, reducing the overall strength of the chain.

SUMMARY OF THE INVENTION

Accordingly, the invention aims at solving the aforementioned prior art problems by providing a chain whose manufacturing and assembly costs are reduced; which has reduced wear, elongation, heat and noise, otherwise caused by repetitive deformation of link pins and guide link plates; and improved durability and strength.

The silent chain of the invention is in the form of an endless loop comprising guide link rows and non-guide link rows. Each guide link row comprises a pair of guide plates, and each non-guide link row comprises at least one link plate. The guide link rows and non-guide link rows are disposed alternately along the length of the chain with each plate of each row overlapping each plate of each of two adjacent rows. Each plate has first and second holes, one of the first and second holes being a front hole and the other of the first and second holes being a rear hole. The terms "front and rear" are used with reference to a direction of travel of the chain.

A pair of connecting pins is provided for each guide link row for connecting the guide link rows and non-guide link rows in articulating relationship. The first connecting pin of each pair has end portions extending into a first hole of each of the guide plates of its guide link row, and an intermediate portion extending into and through a second hole of each link plate of an adjacent non-guide link row. The second connecting pin of each pair has end portions extending into a second hole of each of the guide plates of its guide link row and an intermediate portion extending into and through a first hole of each link plate of an adjacent non-guide link row. Each connecting pin fits tightly in each first hole into which it extends and fits loosely in each second hole into which it extends.

Accordingly, the guide link plates do not warp when tension is applied to the chain and therefore, wear, elongation, heat, and noise otherwise caused by repetitive deformation of the guide link plates are reduced and durability of the chain is improved. Also, because the pin holes in the link plates are arranged such that the pins fit tightly and loosely in a specific arrangement, which is the same across the entire chain, the tension is dispersed equally in the width direction, preventing the link pins from bending. Thus, the tension is not concentrated on any one link plate, improving the strength of the chain.

In addition, because the link plates of the guide and non-guide link rows are arrayed alternately, each guide link row has one more link than each non-guide link row. This results in the second pin having one less tight fitting pin hole than the first pin. Thus, when a tension is applied to the chain, when the second pin would otherwise tend to bend, the pressure is more evenly balanced throughout the width of the chain. This allows for a reduction in wear, elongation of the chain and heat.

Furthermore, because a sliding surface pressure is applied substantially equally to all of the pin holes, the holes wear equally, preventing pitch error.

In another embodiment, each of the guide link rows comprises at least one intermediate link plate having first and second pin holes. A connecting pin fits tightly in the first pin hole and another connecting pin fits loosely in the second pin hole.

Because an intermediate link plate is provided in the guide link row, even when the width of the chain is increased, and the connecting pins lengthened, the link pins are only slightly bent even though the link plates of the non-guide link rows impart stress to the chain when it is in motion.

In another embodiment, each of the guide link rows comprises at least one intermediate link plate having first and second pin holes. A connecting pin fits loosely in the first pin hole and another connecting pin fits loosely in the second pin holes. By reducing the number of pin holes which require a tight fitting pin, i.e., by providing pin holes which fit the connecting pins loosely, manufacturing and assembly costs are reduced.

In another embodiment, each of the guide link rows comprises at least one of a first type of intermediate link plate and at least one of a second type of intermediate link plate. Each of the intermediate link plates of the first and second types have first and second holes. A first connecting pin fits tightly in the first hole of the first type of intermediate link plate and a second connecting pin fits loosely in the second hole of the first type of intermediate link plate. The first and second connecting pins both fit loosely in the first and second holes of the second type of intermediate link plate.

Even if the chain is widened by the addition of additional link plates, resulting in the need for a longer connecting pin, by providing a tight fitting hole in the first hole of the intermediate link plate, the bend in the link pin is reduced. Yet, by providing a loose fit in the second hole of the first type of intermediate link plate, and in both holes in the second type of intermediate link plate, manufacturing and assembly costs are reduced.

Preferably, at least one link plate, which can be an intermediate link plate, has teeth for engagement with a sprocket. The sprocket teeth apply tension relatively consistently over the length of the chain. Thus, elongation, heat and noise due to repetitive deformation of the link pins and plates, are reduced, and overall durability is improved.

In another embodiment, the guide plates have teeth that engage with a sprocket. Thus, even when the chain is narrow, and has a small number of intermediate link rows, the guide plates themselves engage the sprocket and allow tension to be applied relatively consistently over the chain. Durability is therefore increased.

DETAILED DESCRIPTION OF THE PREFERRED EMBODIMENTS

Figure 1:
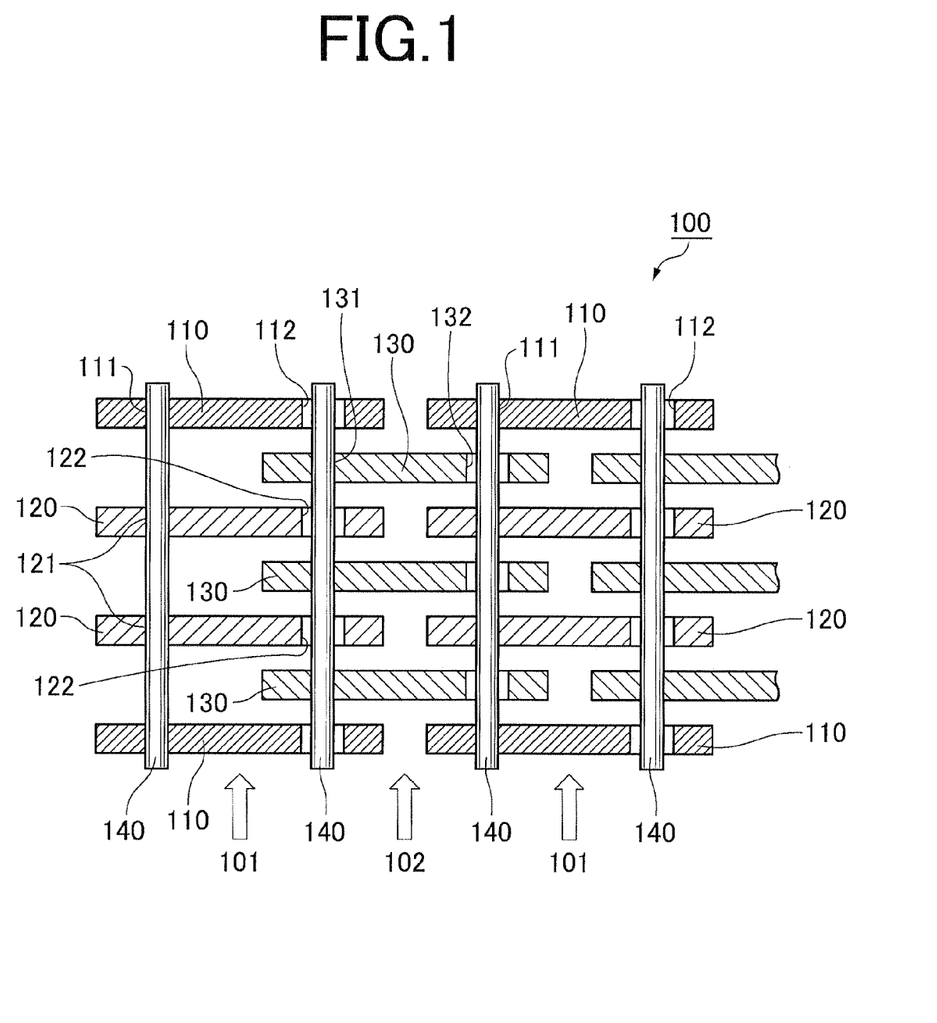
FIG. 1 is an explanatory plan view of a chain according to a first embodiment of the invention.
Figure 2:
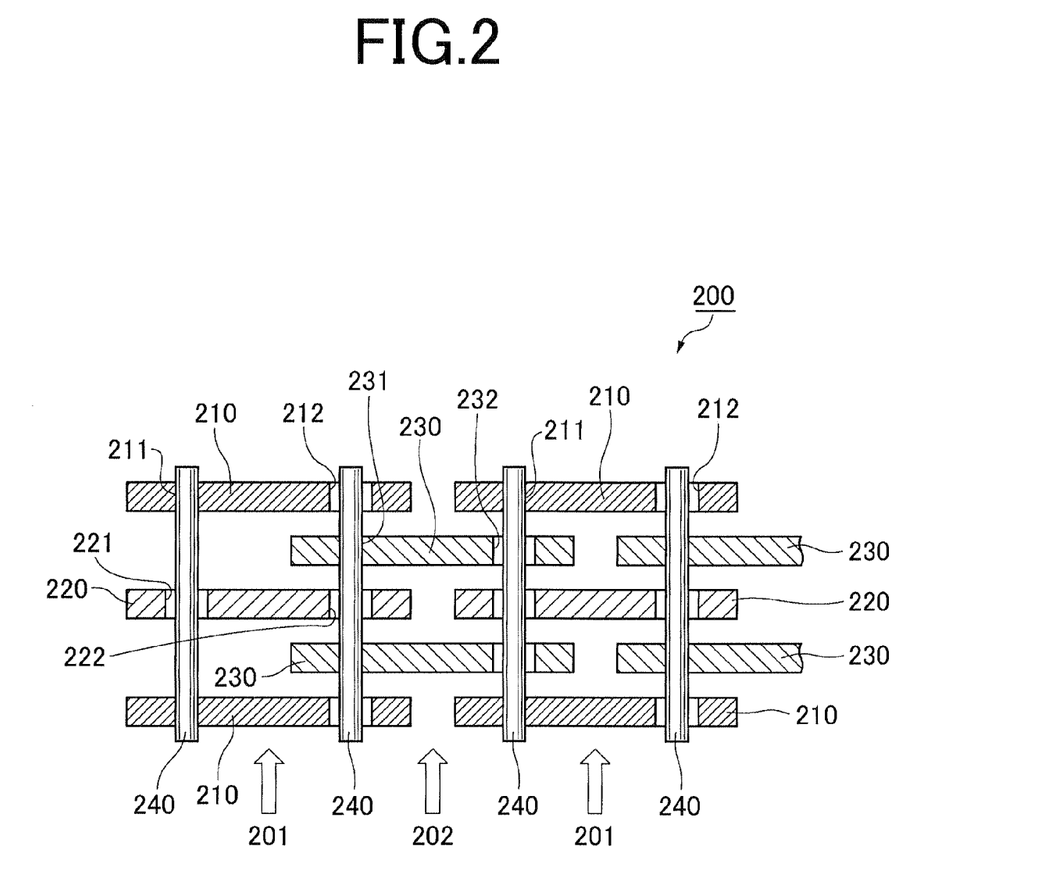
FIG. 2 is an explanatory plan view of a chain according to a second embodiment of the invention.
Figure 3:
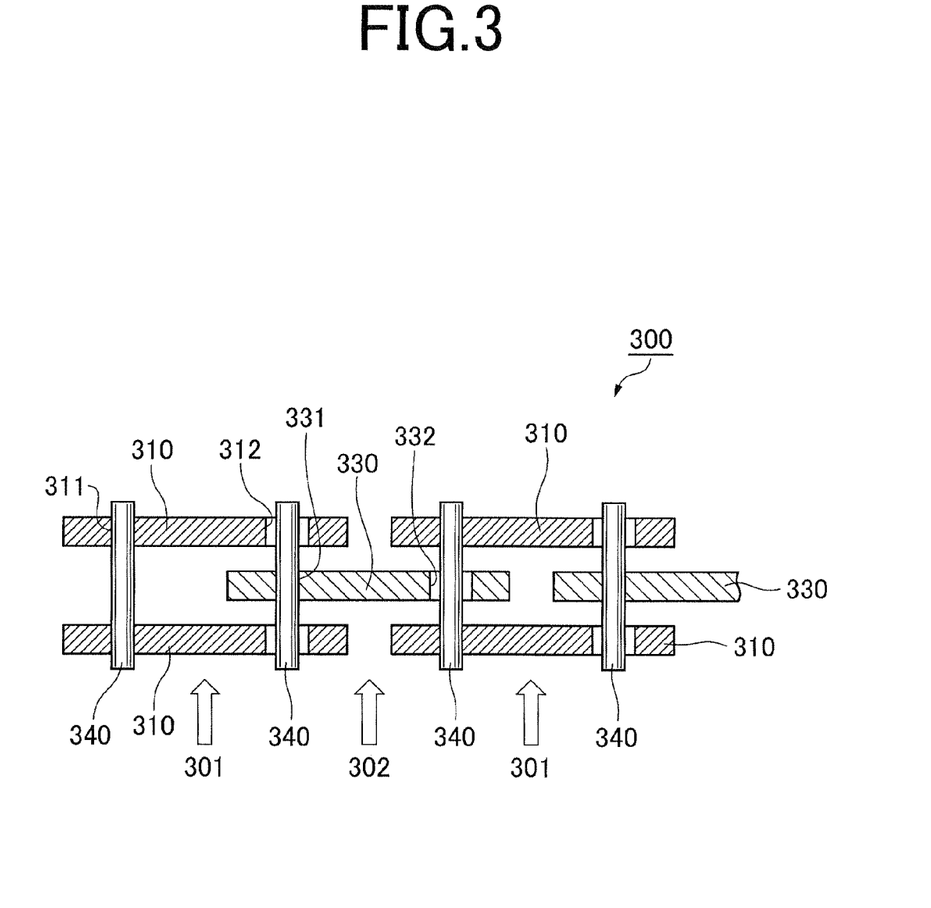
FIG. 3 is an explanatory plan view of a chain according to a third embodiment of the invention.

As shown in FIGS. 1-3, a silent chain 100 having guide plates 110 is constructed by alternately stacking intermediate link plates 120 in guide link rows with inner link plates 130 in non-guide link rows.

Each of the plates 110, 120 and 130 has a first and second hole, referred to as "front" and "rear" holes, i.e., first pin holes 111, 121 and 131 and second pin holes 112, 122 and 132. The terms "front" and "rear" refer to the normal direction of movement of the chain, and are of no significance in the embodiment shown because the guide plates are symmetrical.

The chain 100 is constructed by connecting the link plates by inserting the first of each pair of connecting pins 140 through the first pin holes 111 and 121 of the guide link plates 110 and the intermediate link plates 120 of each guide link row 101; and through the second pin holes 132 of the inner link plates 130 of each non-guide link row 102. The second of each pair of connecting pins is inserted through the second pin holes 112 and 122 of the guide link plates 110 and the intermediate link plates 120 of each guide link row 101 and the first pin holes 131 of the inner link plates 130 of each non-guide link row 102.

The link pins 140 fit tightly into the first pin holes 111, 121, and 131 of the guide link plates 110, intermediate link plates 120 of the guide link row, and the inner link plates of the non-guide link row 130. The link pins fit loosely into the second holes 112, 122, 132 of the guide link plates 110, intermediate link plates 120, and inner link plates 130. There is a pre-determined gap between the pin 140 and the sides of the loose fitting holes 112, 122, 132.

The chain of the invention reduces warping due to tension on the chain, reducing wear, elongation, heat and noise and improving durability. Also, because the pin holes in the link plates are arranged such that the pins fit tightly and loosely in a specific arrangement, which is the same across the entire chain, the tension is dispersed equally in the width direction, preventing the link pins from bending. Thus, the tension is not concentrated on any one link plate, and the strength of the chain is improved. Further, wear due to elongation of the chain, heat and noise, otherwise caused by the repetitive deformation of the link pins, are reduced.

Although the embodiment in FIG. 1 shows two intermediate link plates 120 and three inner link plates 130 in the width direction, in all embodiments, the number of link plates can vary without departing from the scope of the invention. Further, although, in FIG. 1, the guide link plate 110 and the intermediate link plate 120 of each guide link row are disposed alternately with an inner link plate 130 between them, the invention also encompasses chains in which intermediate link plates 120 are stacked, without an intervening inner link plate. Further, the invention also encompasses chains in which inner link plates 130 are stacked, without an intervening intermediate link plate.

Although the guide link plates 110, the intermediate link plates 120 and the inner link plates 130 are shown to have relatively large gaps between them in FIG. 1, in all embodiments the space between the plates is not a limiting feature of the invention. The gaps must allow the link plates to slide and bend easily, and, for example, engage with a sprocket when necessary.

In another embodiment, the widthwise distances between the plates can be greatly increased, allowing sprocket teeth to engage with the link pins 140.

As shown in FIG. 2, in another embodiment, the chain has at least one intermediate link plate 220 having two pin holes 221 and 222. While the connecting pins fit tightly into the first holes 211, 231 of the guide link plates 210, and inner link plates 230, the pins fit loosely into both holes 221 and 222 of the intermediate link plate 220, and the second holes 212, 232 of the guide link plates 210 and inner link plates 230.

When tension is applied to the chain, the guide link plates 210 do not warp, reducing elongation due to wear, heat and noise, improving the durability of the chain. Further, when fewer inner and intermediate link plates are provided, e.g., when the width of the chain is narrower, because the first pin holes 211 and 231 fit tightly with the link pins 240 and the second pin holes 212 and 232 fit loosely with the link pins 240, the force is dispersed equally in the width direction and the bend of the link pins 240 is reduced. However, by providing loose fitting pin holes 221 and 222 in the intermediate link plate 220, manufacturing and assembly costs are reduced.

In another embodiment, the widthwise distances between the intermediate link plate 220 and the inner link plates 230 can be increased, or the intermediate link plate 220 can be eliminated, allowing the sprocket teeth to engage with the link pins 240.

As shown in FIG. 3, in another embodiment, a chain 300 has a pair of guide plates 310 alternately stacked with one inner link plate 330 in each non-guide link row 302. The respective link pins 340 are tightly fitted into the first pin holes 311 of the guide link plates 310 or the first pin holes 331 of the inner link plate 330 and are loosely fitted into the second pin hole 332 of the inner link plate 330 or the second pin holes 312 of the guide plates 310 with a predetermined gap.

Accordingly, the guide link plates 310 do not warp when the tension is applied to the chain. Further, because there is a reduced number of link plates in the width direction and the link pins 340 are short, bending of the link pins 340 is reduced. Hence, elongation due to wear, heat and noise otherwise caused by the repetitive deformation of the link pins are reduced and durability of the chain is improved.

Figure 4:
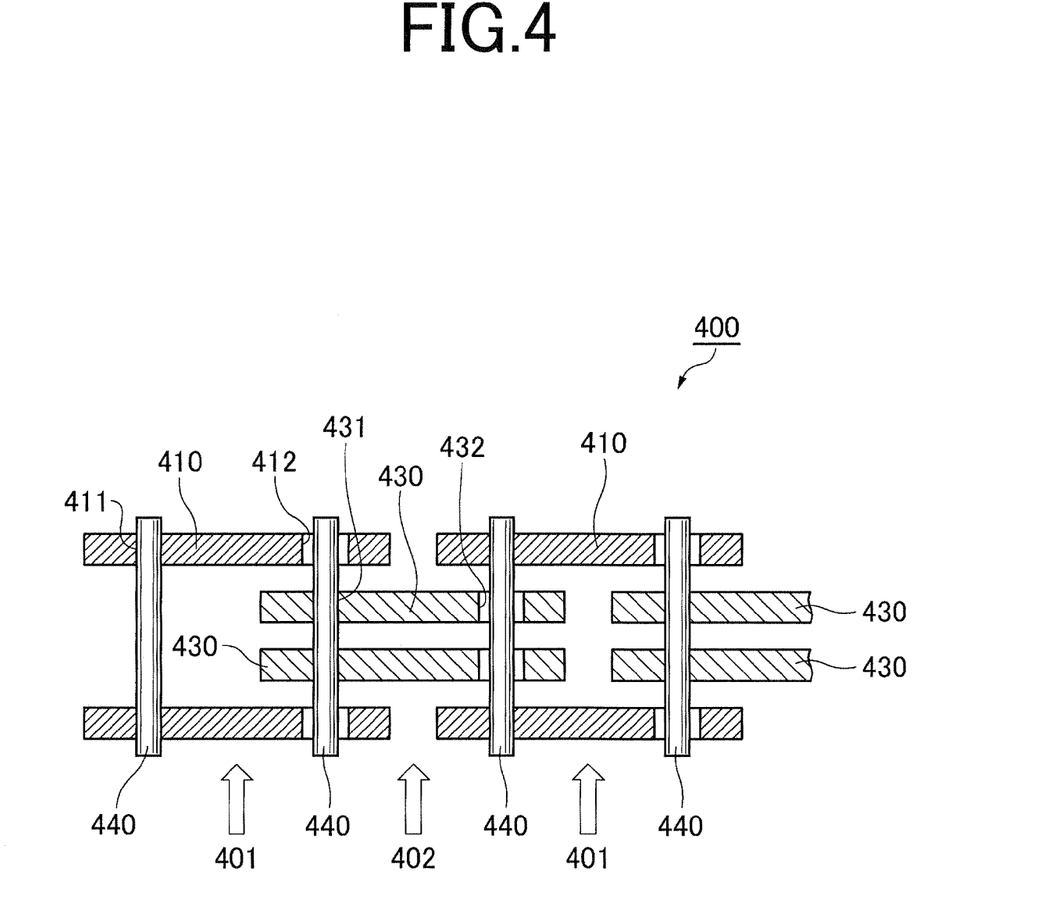
FIG. 4 is an explanatory plan view of a chain according to a fourth embodiment of the invention.

Although FIG. 3 shows the guide link plates 310 and the inner link plate 330 having almost the same thickness, the inner link plate 330 can be thickened so as to have an equal tensile strength with the pair of guide link plates 310. In another embodiment, as show in FIG. 4, the inner link plates 430 are doubled so that the inner link plates have an equal tensile strength with the pair of guide plates 310.

In side view, the link plates can take any of various shapes, provided they function as conventional link plates of a chain. Thus, the link plates can have sprocket-engaging teeth protruding toward the inside of the loop formed by the chain, toward the outside, or both toward the inside and toward the outside, on the lower surface, upper surface or both. Link plates of the chain may also be oval or gourd-shaped.

What is claimed is:

1. A silent chain in the form of an endless loop comprising:
guide link rows, each comprising a pair of guide plates, and non-guide link rows, each comprising at least one link plate, the guide link rows and non-guide link rows being disposed alternately along the length of the chain with each link plate of each said non-guide link row overlapping each guide plate of each of two adjacent guide link rows, each guide link plate and each link plate of each of said non-guide link rows having first and second holes, one of said first and second holes being a front hole and the other of said first and second holes being a rear hole; and
a pair of connecting pins for each said guide link row for connecting each said guide link in articulating relationship with two said non-guide link rows adjacent said guide link row, a first connecting pin of each said pair having end portions extending into said first hole of each of the guide plates of said each said guide link row and having an intermediate portion extending into and through said second hole of each said at least one link plate of one of said non-guide link rows adjacent said each said guide link row, and a second connecting pin of each said pair having end portions extending into a second hole of each of the guide plates of said each said guide link row and having an intermediate portion extending into and through said first hole of each said at least one link plate of the other of said non-guide link rows adjacent said each said guide link row; and
wherein each said first and second connecting pin fits tightly in each said first hole of each said guide plate and link plate of a non-guide link row into which it extends and fits loosely in each second hole of each said guide plate and link plate of a non-guide link row into which it extends.

2. The silent chain according to claim 1, wherein each of the guide link rows comprises at least one intermediate link plate between the guide plates thereof, said intermediate link plate of said each of said guide link rows having first and second pin holes, and wherein a connecting pin fits tightly in the first pin hole of said intermediate link plate of said each of said guide link rows and another connecting pin fits loosely in the second pin hole of said intermediate link plate of said each of said guide link rows.

3. The silent chain according to claim 1, wherein each of the guide link rows comprises at least one intermediate link plate having first and second holes, and wherein each said first and second connecting pin fits loosely in the first and second holes of each said intermediate link plate.

4. The chain according to claim 1, wherein each said at least one link plate has teeth that engage with a sprocket.

5. The chain according to claim 2 wherein each said at least one link plate and said at least one intermediate link plate of said each of said guide link rows have teeth that engage with a sprocket.

* * * * *